United States Patent [19]

Lightfoot

[11] 4,179,253

[45] Dec. 18, 1979

[54] LINEAR CORRUGATING ROLL DEFLECTION CONTROL

[75] Inventor: Herbert D. Lightfoot, Montreal, Canada

[73] Assignee: Domtar Inc., Montreal, Canada

[21] Appl. No.: 895,160

[22] Filed: Apr. 10, 1978

[51] Int. Cl.$^2$ .................... B29D 7/14

[52] U.S. Cl. .................... 425/369; 264/175; 264/286

[58] Field of Search .................... 264/286, 287, 175; 425/369; 162/117, 362

[56] References Cited

U.S. PATENT DOCUMENTS

| | | | |
|---|---|---|---|
| 2,257,429 | 9/1941 | Ruegenberg | 264/287 |
| 2,901,951 | 9/1959 | Hochfeld | 264/287 X |

*Primary Examiner*—Thomas P. Pavelko

*Attorney, Agent, or Firm*—C. A. Rowley

[57] ABSTRACT

A linear corrugator formed by at least two rows of discrete presses each of which is formed by mating pairs of press rolls having circumferentially extending mating ridges and grooves adapted to corrugate and consolidate dry formed web, is herein disclosed. The presses of one of said rows are staggered relative to the presses in the other of said rows, the maximum axial length of the nip of each of said presses must be between 5 and 36 inches.

A method of consolidating a dry formed web by independently consolidating discrete laterally spaced areas of a dry formed web of at least 40" width, each of said discrete areas having a width of over about 5" but never exceeding 36", thereby to consolidate substantially the full width of said web.

4 Claims, 3 Drawing Figures

LINEAR CORRUGATING ROLL DEFLECTION CONTROL

FIELD OF THE INVENTION

Present invention relates to a press for consolidating a dry formed web of paper making fibres of significant width. More particularly the present invention relates to a method and apparatus for simultaneously longitudinally corrugating and consolidating a dry formed web of significant width.

BACKGROUND OF THE INVENTION

It has been proposed to dry form a web of cellulosic material and to simultaneously corrugate and consolidate it in Cdn. Pat. No. 955,094 issued Sept. 24, 1974—Bodycomb. It has further been proposed to produce a linear corrugated web, i.e. a web having a corrugation extending in the longitudinal direction by simultaneously corrugating and consolidating a dry formed web (see Cdn. Pat. No. 955,095 issued Sept. 24, 1974 to Flewwelling).

The concept of forming a corrugated board with the corrugations extending longitudinally thereof i.e. the longitudinal or machine direction of the liners has been a goal of the corrugated paper board industry for many years but it was not until the Bodycomb invention referred to hereinabove was modified as taught by Flewwelling that it was possible to do so in any reasonable width. This is because linearly corrugating a web of paper requires condensing the web widthwise as it is corrugated longitudinally thereby making a corrugating and handling operation extremely difficult and limiting the maximum width of the corrugated web significantly.

The corrugating technique of Flewwelling eliminated these problems of condensing a web laterally. However, the technique created other problems. When a wide web, say, 96", is consolidated, the press nip for consolidating the web must be at least 96" long and it is impossible to provide a suitable press operable at the required pressures and temperatures without resorting to extremely complex construction and very accurate control of temperatures of the mating rolls. The problem is further compounded because with a linear corrugated web the width of the web determines the maximum circumference of a corrugated box and in many cases this circumference is quite large.

It will be noted that with mating ridges and grooves extending circumferentially of the rolls as required for linear corrugating, any relative deflection of the rolls changes the angular relationship of these ridges and grooves and prevents their accurate mating e.g. if the rolls bend along their longitudinal axes by deflection under pressure in the nip the central planes (radial) of the ridges on each roll will tend to converge toward the centre of the nip whereby the ridges at the ends of one roll will not align with the mating grooves on the other roll.

Consolidation to form a linear corrugated web further complicates the operation since the inter-meshing of the two rolls wherein minor differences in thermal expansion between the mating press rolls forming the nip (the consolidation is at elevated temperature) accumulates across the axial length of a nip or (the width of the web). These differences in expansion coupled with deflection of the rolls make it substantially impossible to obtain acceptable uniform consolidation when a web wider than 40" is consolidated.

Thus in the manufacture of consolidated webs dry formed sheets wherein the web is a significant width i.e. about 40" and wider, problems are encountered in consolidation due to basis weight variation, deflection due to high pressure used in the nip and temperature differential between the rolls.

BRIEF DESCRIPTION OF THE INVENTION

It is therefore the object of the present invention to provide a means for applying the technique for consolidation of relatively wide dry formed webs into relatively wide longitudinally (linearly) corrugated consolidated paper sheets.

Broadly the present invention relates to an apparatus for simultaneously corrugating and consolidating an unconsolidated dry formed fibrous web, comprising, means for feeding a dry formed web in a direction between first press means and a second press means, said first and second press means being spaced in said direction of travel and laterally of said direction of travel, each said press being formed of mating rolls having circumferentially extending mating ridges and grooves to simultaneously corrugate and consolidate said dry formed web; said first press means providing at least one first nip and said second press means providing at least one second nip; said first and said second nips receiving discrete laterally spaced areas of said web thereby to consolidate and corrugate said areas; the longitudinal length of each said nip is between 5 and 36". Preferably the ridges at at least one axial end of the second press means of at least one said second nip is positioned in alignment with the path of travel of the corrugation formed at one axial end of said press means of at least one of said first nips.

The method of the present invention comprises longitudinally advancing a non-consolidated dry formed web having a width of at least 40", consolidating at least one discrete transverse section of said web, having a width in the range of between 5 and 36 in at least one first nip, advancing said web, including said at least one discrete consolidated transverse section to move a second discrete transverse section of said web of a width between 5 and 36 in at least one second nip, to thereby consolidate said at least one second discrete section of said dry formed web. Preferably said second discrete section will overlap slightly said first discrete section.

BRIEF DESCRIPTION OF THE DRAWINGS

Further features, objectives and advantages will be evident from the following detailed description of the preferred embodiments of present invention taken in conjunction with the accompanying drawings in which

As shown in FIGS. 1 and 2, presses 1, 2, 3, 4, 5 etc. each is composed of a pair of cooperating rolls 10 and 12 respectively are arranged in at least two rows 14 and 16.

Figure 3:
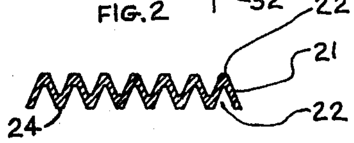
FIG. 3 is a section along the line 3—3 of FIG. 2 illustrating a consolidated corrugated board.

Each of the rolls 10 and 12 are formed with cooperating lands or ridges 18 and grooves 20 with the ridges on one roll of a pair of mating rolls fitting within the grooves of the other roll of the pair and vice-versa. The specific profile of these ridges and grooves 18 and 20 determines the cross sectional shape of the corrugated web. It is important that under proper pressing condition with clearance between the land and groove areas of the mating rolls be relatively uniform to obtain uniform consolidation, particularly in the area of the shank as indicated at 21 of the corrugations 22 of the consolidated web 24 (see FIG. 3).

Figure 1:
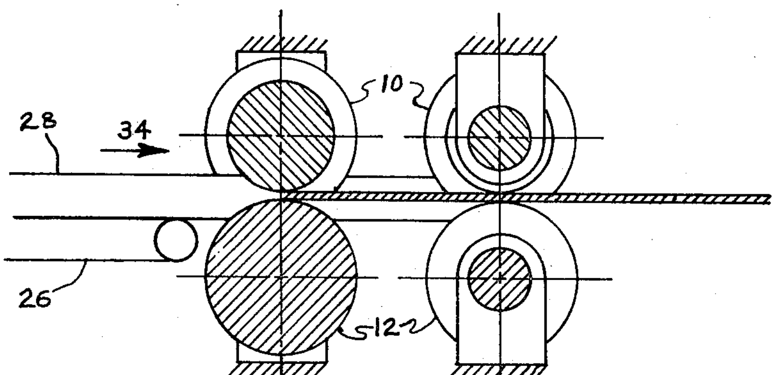
FIG. 1 is a section along the line 1—1 of FIG. 2.
Figure 2:
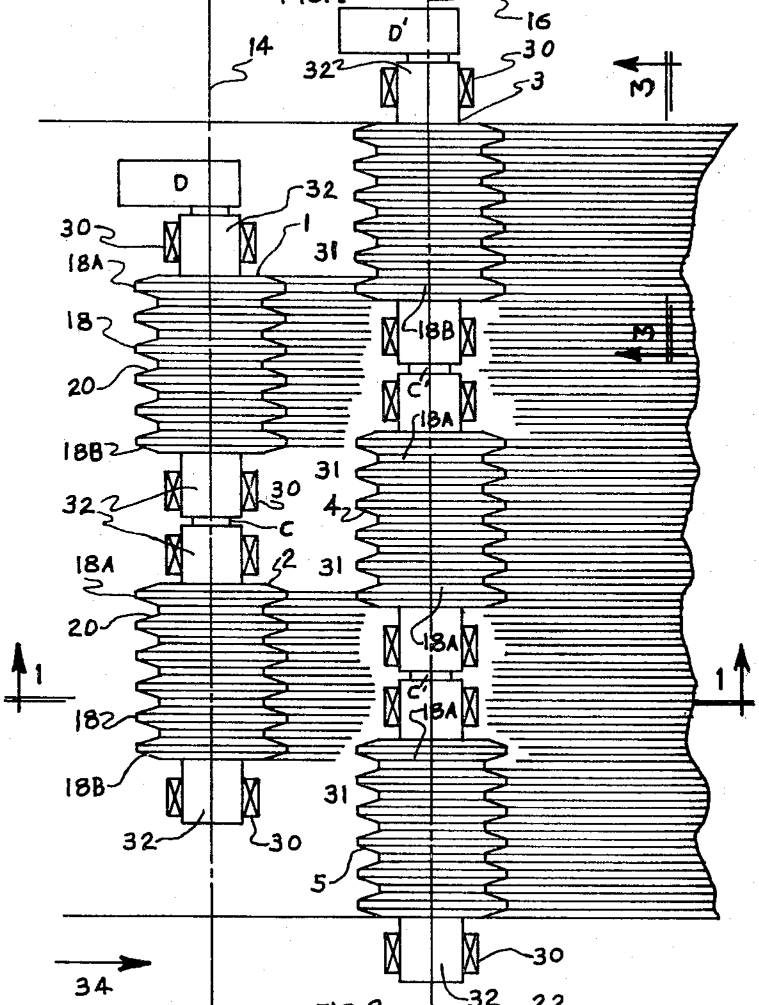
FIG. 2 is a schematic plan view of the present invention.

An in-feed conveyor 26 (see FIG. 1) is provided to deliver the non-consolidated dry formed fibrous web 28 into the linear corrugator.

It will be noted in the first row 14 of presses there are two presses 1 and 2 positioned in space relation to one another to provide a space for properly supporting the press rolls in any suitable press means, for example via the bearings 30 on the shafts 32 on the rolls 10 and 12 of each press. There may be as many presses as desired in this row 14 but in the illustrated arrangement only 2 have been shown. Each press 1, 2 etc. forms a first nip for consolidating and corrugating discrete laterally spaced areas of the dry formed web.

The presses in the second row 16 are staggered relative to the presses in the first row 14, however, there should be an overlap of at least one ridge or land area of the presses to facilitate uniform spacing of the corrugations. If uniform spacing is not a requisite, this overlap may be eliminated. The presses in the second row 16 must also be spaced in the same manner as those in the first row 14 sufficient to provide adequate support for press rolls so that the proper pressures may be applied to each of the pairs of rolls 10 and 12 of the presses 3, 4 and 5. As above indicated the number of rolls in the second row may also vary depending on the number of rolls in the first row i.e. the width of the web to be consolidated. Each of the presses 3, 4, 5 etc. forms of second nip for corrugating and consolidating discrete laterally spaced areas of the dry formed web.

The top rolls of presses 1 and 2 are coupled by suitable couplings C and driven by a drive D as are the bottom rolls. Similarly the top rolls of presses 4, 5 and 6 are coupled via couplings $C^1$ and driven by drive $D^1$ as are the bottom rolls. The top and bottom rolls of the presses are preferably driven at substantially the same speed.

The pressures in the nips formed between the rolls 12 and 12 in each of the presses 1, 2, 3, 4 and 5 may be as high as 10,000 pli and the temperature may be approximately 200° C. when chemically liberated cellulosic fibers having a moisture content of up to about 30% are being processed.

It has been found that the operative length of the nip for each pair of press rolls is extremely important and that this length (the axial length of the nip projected onto the longitudinal axis of the roll) should never exceed 36 inches, and normally will be greater than about 5 inches. To obtain the best possible operation, particularly in relation to linear corrugating utilizing webs of non-uniformed transverse basis weight profile and pressures and temperatures generally used for consolidation as outlined hereinabove the nip length should be between 10 and 30 inches.

In operation, a dry formed non-consolidated web 28 delivered via the conveyor 26 into the set of first nips formed between the rolls 10 and 12 in the presses 1 and 2 thereby to simultaneously corrugate and consolidate discrete spaced apart areas of the web. The web continues to move in the longitudinal direction as indicated by the arrows 34 so that the areas of the web not consolidated by the presses 1 and 2 are consolidated in the set of second nips between the rolls 10 and 12 in presses 3, 4 and 5. Thereby to complete the consolidation and the corrugation of the remainder of the web.

The overlap 31 at the end of the rolls in rows 14 and 16 ensures that the corrugations formed by the presses 1 and 2 are uniformly positioned relative to the corrugations formed by the presses 3, 4 and 5. The corrugations formed by the land area 18B of press 2 align with land area 18A of press 4. Similarly the land area 18A of press 1 will align with the land area 18B of press 3 and the land area 18B of press 2 will align with the land area 18A of press 5.

It is apparent that present invention provides means of over-coming the deflection and expansion problems of long presses by forming a plurality of discrete cooperating presses thereby to linearly corrugate and consolidate a wide dry formed web.

Modifications will be made without departing from the spirit of the invention as defined in the amended claims.

I claim:

1. A linear corrugator for simultaneously corrugating and consolidating a non-consolidated dry formed fibrous web comprising; means to advance said web in a direction, a first consolidating press means and a second consolidating press means, said second press means being spaced from said first press means in said direction, each of said press means being formed by a pair of mating rolls having their rotational axes perpendicular to said direction, each said roll having a plurality of circumferentially extending ridges and grooves adapted to mate with similar ridges and grooves in the mating roll thereby to simulataneously corrugate and consolidate said dry formed web; said first press means providing a first consolidating pressure nip and said second press means providing a second consolidating pressure nip; said first and said second nips being axially offset in the direction of said rotational axes of said rolls to corrugate and consolidate substantially only discrete areas of said web, said second nip being positioned to at most corrugated and consolidate only a portion of the web corrugated and consolidated by said first nip, the longitudinal length of each of said nip in the direction of said axes of rotation being between 5 and 36".

2. A corrugator as defined in claim 1 further comprising a third press means forming a third corrugating and consolidating pressure nip, said third press means being axially spaced along the axes of rotation of said rolls of one of said first and said second press means and said third nip being axially offset in the direction of said axes of rotation of corrugate and consolidate an area of said web discrete from said areas.

3. A corrugator as defined in claim 1 wherein one of said ridges at least one axial end of said second press is positioned in alignment with the path of travel of a corrugation moving in said direction and formed at one axial end of said first nip.

4. A corrugator as defined in claim 3 further comprising a third press means forming a third corrugating and consolidating pressure nip, said third press means being axially spaced along the axes of rotation of said rolls of one of said first and said second press means and said third nip being axially offset in the direction of said axes of rotation to corrugate and consolidate an area of said web discrete from said areas.

* * * * *